Sept. 18, 1934.  A. W. RITTER  1,974,083
MOLASSES GATE
Filed Oct. 10, 1932
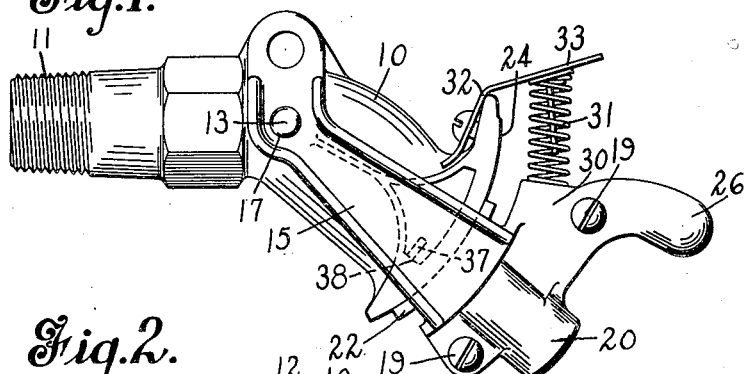
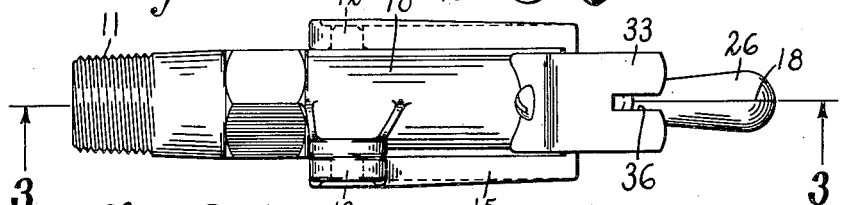
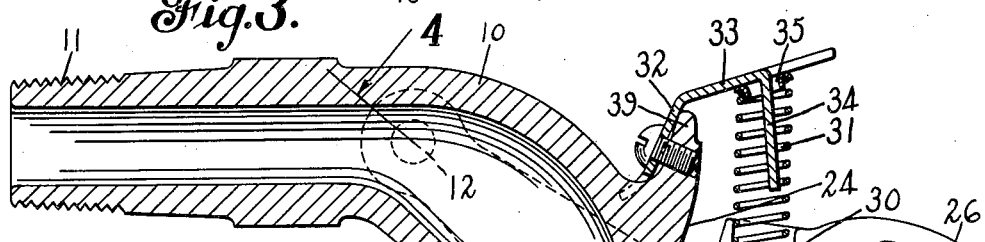
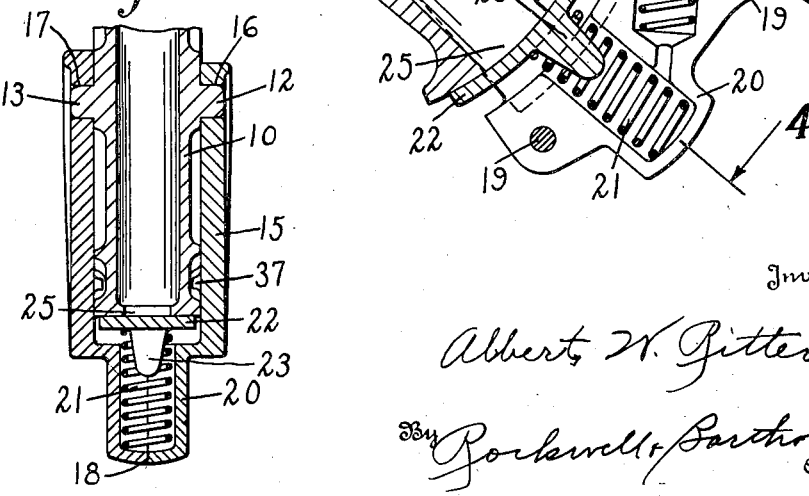
Inventor
Albert W. Ritter
By Rockwell & Bartholow
Attorney Patented Sept. 18, 1934

1,974,083

UNITED STATES PATENT OFFICE 1,974,083

MOLASSES GATE

Albert W. Ritter, New Haven, Conn., assignor to Sargent & Company, New Haven, Conn., a corporation of Connecticut Application October 10, 1932, Serial No. 637,104

7 Claims. (Cl. 251—125)

This invention relates to faucets, spigots, or the like, and more particularly to what is commonly known in the trade as molasses or oil gates, the construction of which embodies a discharge spout or nozzle adapted to be secured to a barrel or other container, and which is provided with a swinging yoke or bail having a sliding valve plate or gate adapted to open and close a discharge passage through the body portion of the device when the yoke is actuated.

In the use of such devices it often occurs that the valve or gate is left in an open position, or is not completely closed after being used, with the result that a discharge or leakage of the contents of the barrel takes place. It is contemplated in the present invention to provide a device of such construction that the gate or valve may not be left in open position, but will be closed automatically when released to effectually prevent the escape of the contents of the container.

One object of the invention is to provide a gate or spigot which is constantly urged to closed position, so that when not held in open position it will be closed automatically.

Another object of the invention is the provision of a molasses gate or spigot so constructed that the valve thereof will be automatically returned to closed position when released.

A still further object of the invention is the provision of a molasses gate or spigot which is constantly urged to closed position, which must be held open against the tension of the closing means, and which will be provided with a rest or fulcrum for a portion of the hand of the operator to facilitate holding the valve in open position.

To these and other ends, the invention consists in the novel features and combinations of parts to be hereinafter described and claimed.

In the drawing:

Fig. 1 is a side elevational view of a molasses gate or spigot embodying my invention;

Fig. 2 is a top plan view of the same;

Fig. 3 is a longitudinal sectional view on line 3—3 of Fig. 2, and

Fig. 4 is a partial sectional view on line 4—4 of Fig. 3.

The spigot selected for illustration has the usual spout or body portion 10 provided at its rear end with screw threads 11 by which it may be mounted in a barrel or other container, in connection with which the spigot is to be used. The body portion 10 is provided with laterally extending bosses 12 and 13, upon which is pivoted a yoke 15, the yoke being of U-shape and having openings 16 and 17 to receive the bosses. It will be understood that this yoke may be conveniently manufactured and installed by being made in two separate halves which meet along the line 18, which halves may be secured together by the screws 19. The yoke is thus pivoted to the body 10 of the spout for swinging movement about the bosses 12 and 13.

The intermediate portion of the yoke is provided with a socket 20 within which is mounted a compression spring 21, which spring acts against a sliding valve plate 22 which has a projecting boss 23 which is embraced by the spring to maintain the valve plate 22 in its proper position and to effect its actuation by the movement of the yoke. The valve plate 22 is of arcuate shape in a vertical direction, as clearly shown in Fig. 3, and fits closely against the outer curved face 24 of the body so as to effectually close the discharge opening 25.

It will be noted that the valve plate is urged tightly against the face 24 by the action of the spring 21. It may also be noted that the face 24 of the body 10 and the valve plate 22 are curved along an arc about the bosses 12 and 13 as a center so as to provide for a close fitting of these parts and prevent any leakage from the discharge opening 25 when the valve is in closed position.

The yoke 15 is provided with a manually engageable member 26 which may be engaged by the hand of the operator to move the yoke about its pivots. It will be understood that this movement of the yoke carries the valve plate 22 with it due to the connection between these parts, and that when the yoke is moved upwardly from the position shown in Fig. 3 (the closed position of the valve), the discharge opening 25 will be uncovered and permit the contents of the container to flow through this opening.

In order that the valve may be urged to closed position when not held in an open position by the operator, the intermediate portion of the yoke 15 is formed with a socket 30, within which is positioned the lower end of a compression spring 31. A fulcrum member 32 is secured to the body portion 10 of the spigot, this member having a portion 33 bent at an angle to the remainder thereof and extending in a generally inclined direction over and beyond the upper end of the spring 31. A tongue 34 is struck downwardly from the middle of this fulcrum member intermediate the edges thereof at a point above the spring 31 so that this tongue extends downwardly into the spring to hold the upper end thereof in position below the fulcrum member. A collar 35 may be inserted into the upper end of the spring to surround the tongue 34 to prevent any likelihood of the end of the spring entering the slot 36 in the fulcrum member, this slot being formed by the striking down of the tongue 34.

It will be noted that the portion 33 of the fulcrum member extends outwardly on each side of the slot 36 beyond the spring 31 to a position above the manually engageable member 26 so that this portion of the fulcrum member may be used as a rest or fulcrum for the thumb or other part of the hand of the operator when holding the valve in open position.

As the spring 31 constantly urges the valve downwardly it will be found advantageous to provide stops of some character to limit the movement of the yoke in this direction. For this purpose the legs of the yoke are provided with small lugs 37 upon the inner sides thereof, which lugs contact with ribs 38 formed on the outer side portions of the body 10 of the spout. The fulcrum member 32 is secured to an ear 39 projecting upwardly from the body portion 10 of the spigot so that the laterally inclined portion 33 of this member will be beyond the normal path of movement of the valve plate 22 and not interfere with the movement of the valve to a full open position. The front face of this ear is a continuation of the face 24.

The operation of the device may be briefly described as follows:

In Fig. 3 the gate is shown in the closed position of the parts wherein the discharge opening 25 is effectually closed to prevent any leakage of the contents of the container to which the device may be connected. In this position the valve plate 22 is held against the face 24 of the spigot by the compression spring 21, and the yoke is urged downwardly by the spring 31, the yoke being in its lowermost position with the stop lugs 37 lying against the ribs 38, as shown in Fig. 1.

If the operator wishes to open the valve or gate, he may conveniently place his thumb upon the extended end of the portion 33 of the fulcrum member and at the same time engage his fingers below the member 26. The valve may then be readily opened by movement of the member 26 upwardly, moving the yoke against the tension of the spring 31 which reacts against the fulcrum member 32. It will be apparent that as soon as the member 26 is released, the yoke will be moved downwardly by the spring 31 to close the valve, the downward movement being limited by the engagement of the lugs 37 against the ribs 38.

It will be apparent that I have provided an automatically closing gate which is economical to manufacture and which at the same time will be easy to operate, unlikely to get out of order, and which will effectually prevent any leakage or loss from the discharge opening of the spigot.

While I have shown and described a preferred embodiment of my invention, it will be understood that it is not to be limited to all of the details shown, but is capable of modification and variation within the spirit of the invention and within the scope of the appended claims.

What I claim is:

1. A molasses gate or spigot comprising a body portion having a discharge opening, a yoke pivoted to said body member and carrying a valve to control said opening, manually engageable means to move the yoke, a spring acting against the yoke to urge it in a direction to close the valve, and means secured to the body portion of the spigot and projecting therefrom over the yoke, said means acting as a stop for said spring and as a thumb-rest for the operator.

2. A gate or spigot comprising a body portion having a forwardly directed discharge opening a yoke pivoted to the body portion and carrying a valve to control said opening, said yoke being provided with an upwardly facing socket in the intermediate portion thereof, means secured to the body of the spigot, having a portion projecting forwardly of the spigot body and directed in a generally lateral direction over said socket, and a spring mounted between said portion and the yoke and having its lower end received in the socket, said spring acting to move the valve to closed position.

3. A gate or spigot comprising a body portion having a forwardly directed discharge opening, a yoke pivoted to the body portion and carrying a valve to control said opening, said yoke being provided with a socket in the intermediate portion thereof, a coil spring having its lower end received in said socket, a member carried by the body portion of the spigot and projecting forwardly of the spigot body over the upper end of the spring, means securing said member to said spring to hold the latter in position, and said spring acting against the yoke to move the valve to closed position.

4. A gate or spigot comprising a body portion having a discharge opening, a yoke pivoted to the body portion and carrying a valve to control said opening, said yoke being provided with a socket in the intermediate portion thereof, a coil spring having its lower end received in said socket, a member carried by the body portion of the spigot and projecting over the upper end of the spring, means securing said member to said spring to hold the latter in position, said spring acting against the yoke to move the valve in closed position, and said means comprising a tongue struck from said member and engaged with the spring.

5. A gate or spigot comprising a body portion having a discharge opening, a yoke pivoted to the body portion and carrying a valve to control said opening, said yoke being provided with a socket in the intermediate portion thereof, a coil spring having its lower end received in said socket, a member carried by the body portion of the spigot and projecting over the upper end of the spring, means on said member engaging said spring to hold the latter in position, said spring acting against the yoke to move the valve in closed position, and said means comprising a tongue struck from said member and engaged with the spring, said member having a portion projecting beyond said spring to serve as a thumb-rest for the operator.

6. In a molasses gate or spigot, a body portion having a curved face surface and discharge opening therethrough, a yoke pivoted to the body portion and carrying a valve to move over said face and control said opening, an upwardly facing socket provided in the yoke, a member secured to the body portion of spigot at the upper surface thereof, said member having a portion extending forwardly over the socket in the yoke, a compression spring having its lower end seated in the socket and contacting at its upper end with the forwardly extending portion of said member, and said portion having a tongue struck downwardly therefrom intermediate the edges thereof and engaged with said spring.

7. In a molasses gate or spigot, a body portion having a curved face surface and discharge opening therethrough, a yoke pivoted to the body portion and carrying a valve to move over said face and control said opening, an upwardly facing socket provided in the yoke, a member secured to the body portion of spigot at the upper surface thereof, said member having a portion extending forwardly over the socket in the yoke, a compression spring having its lower end seated in the socket and contacting at its upper end with the forwardly extending portion of said member, said portion having a tongue struck downwardly therefrom intermediate the edges thereof and engaged with said spring, a manually engageable means on the yoke by which it may be moved, and the forwardly extending portion of said member extending in proximity to said means whereby it may serve as a rest for the thumb of the operator.

ALBERT W. RITTER.